United States Patent [19]
Bergmann

[11] Patent Number: 5,168,718
[45] Date of Patent: Dec. 8, 1992

[54] COOLING DEVICE FOR INSTALLATION IN MOTOR VEHICLES

[75] Inventor: Juergen Bergmann, Markgroeningen, Fed. Rep. of Germany

[73] Assignee: Unitechnica Mobilkaelte GmbH, Moelgingen, Fed. Rep. of Germany

[21] Appl. No.: 767,321

[22] Filed: Sep. 30, 1991

[30] Foreign Application Priority Data

Oct. 1, 1990 [DE] Fed. Rep. of Germany ....... 4031029

[51] Int. Cl.$^5$ ............................................... B60H 1/32
[52] U.S. Cl. ....................................... 62/244; 62/457.9
[58] Field of Search .................. 62/457.1, 457.4, 457.5, 62/457.7, 457.9, 244, 239, 408

[56] References Cited

U.S. PATENT DOCUMENTS

| | | | |
|---|---|---|---|
| 276,590 | 5/1883 | Irish | 62/457.1 X |
| 450,527 | 4/1891 | Poyner | 62/457.1 X |
| 1,922,456 | 8/1933 | Powell | 62/408 X |
| 1,938,141 | 12/1933 | Goldkind | 62/244 X |
| 3,164,971 | 1/1965 | Gentz | 62/244 X |
| 4,236,749 | 12/1980 | Schlums | 62/244 X |
| 4,545,211 | 10/1985 | Gaus | 62/244 X |
| 4,711,099 | 12/1987 | Polan et al. | 62/457.4 |
| 4,759,190 | 7/1988 | Trachtenberg et al. | 62/457.9 X |

FOREIGN PATENT DOCUMENTS 3639089 5/1988 Fed. Rep. of Germany .

*Primary Examiner*—William E. Tapolcai
*Attorney, Agent, or Firm*—Sixbey, Friedman, Leedom & Ferguson

[57] ABSTRACT

Cooling device for installation in motor vehicles with a refrigeration unit and a cooling space in operative connection with it for receiving a product to be cooled. The refrigeration unit is in operative connection with a receiving chamber, which just like the refrigeration unit itself, is designed for permanent installation in the motor vehicle. The cooling space is provided in a transportable cold storage box which can be put into the receiving chamber and taken out of the receiving chamber as desired and which is in detachable connection with the refrigeration unit when it is in the receiving chamber.

20 Claims, 2 Drawing Sheets

COOLING DEVICE FOR INSTALLATION IN MOTOR VEHICLES

BACKGROUND OF THE INVENTION

The invention relates to a cooling device for installation in motor vehicles with a refrigeration unit and a cooling space in operative connection with it for receiving cooled product.

Devices of this type are known, for example, from published German application 36 39 089 A1. They allow, for example, a certain supply of beverages to be kept cool during travel. However, the use possibilities of such cooling devices are limited.

SUMMARY OF THE INVENTION

The object of the invention is to provide a cooling device for installation in motor vehicles, which has a considerably broadened field of use.

Starting from a cooling device of the initially mentioned type, according to this invention, this object is achieved in that the refrigeration unit is in operative connection with a receiving chamber which, just like the refrigeration unit itself, is designed for permanent installation in the motor vehicle, and in that in the cooling space is designed as a transportable cold storage box, which is detachable from the refrigeration unit, so that it can be put into the receiving chamber and taken out of the receiving chamber as desired.

When the cold storage box is inserted in the receiving chamber, cooled product placed in the cold storage box can be cooled down and/or kept cool in the usual way. But then, the transportable cold storage box allows the user, on leaving the motor vehicle, to take the cooled product with him or her in the cold storage box, for example to the beach, golf course or other recreational activities. In this case, the cooled product, if the cold storage box is designed as a heat-insulated container, can continue to be kept cold for a considerable period. By ending the link of the cold storage box to the motor vehicle, the cooled down cooled product can be made available away from the motor vehicle. In this case the cold storage box, itself, remains easy to manage and light since the refrigeration unit and other related parts remain permanently installed in the motor vehicle.

The cold storage box is, suitably, provided with a hinged cover, which, on the one hand, allows a convenient access to the cooling space and, on the other hand, counteracts a cold loss.

Advantageously, the refrigeration unit is placed in a housing in which the receiving chamber for the transportable cold storage box is also located. This leads to a substantial facilitating of the installation of the cooling device in the motor vehicle. This housing can, suitably, receive an open-loop and/or closed-loop control for the refrigeration unit and all control elements.

It is also advantageous if a cold air circulation device is associated with the refrigeration unit, which, if the cold storage box is inserted in the receiving chamber, causes cold air to enter the cold storage box by a circulating circuit which also draws off air from the cold storage box. In this case, preferably, the cold storage box is provided with a cold air intake and an air outlet, which, during insertion of the cold storage box in the receiving chamber are automatically connected to the circulating circuit, and during removal of the cold storage box from the receiving chamber, are automatically closed. As a result, cold loss is prevented when the cold storage box is removed from the receiving chamber.

The open-loop and closed-loop control device of the refrigeration unit can suitably be equipped with two thermostats, of which one is set at a permanent desired temperature, for example +2° C., to which the cooling space is cooled in case of intended removal of the cold storage box, while the other thermostat can be set to a desired temperature that is adjustable within a provided range, for example, from +4° C. to +12° C. As a result it is possible, in a simple way, for a user to cool the cooling space, as well as any product that has been placed in the cooling space, to a comparatively low temperature, and to carry along the cold storage box, later, after leaving the motor vehicle.

A signal lamp can, advantageously, be associated with the thermostat that determines the permanent desired temperature. In this way, an indication can be provided which shows when the cooling space has been cooled to the proper temperature for removal of the cold storage box.

The refrigeration unit can, basically, be designed in any way. Especially, the refrigeration unit can be designed as a compression refrigerating machine, as an absorber refrigerating machine or as Peltier refrigerating machine.

These and further objects, features and advantages of the present invention will become apparent from the following description when taken in connection with the accompanying drawings which show, for purposes of illustration only, a single embodiment in accordance with the present invention.

DETAILED DESCRIPTION OF THE PREFERRED EMBODIMENTS

Figure 1:
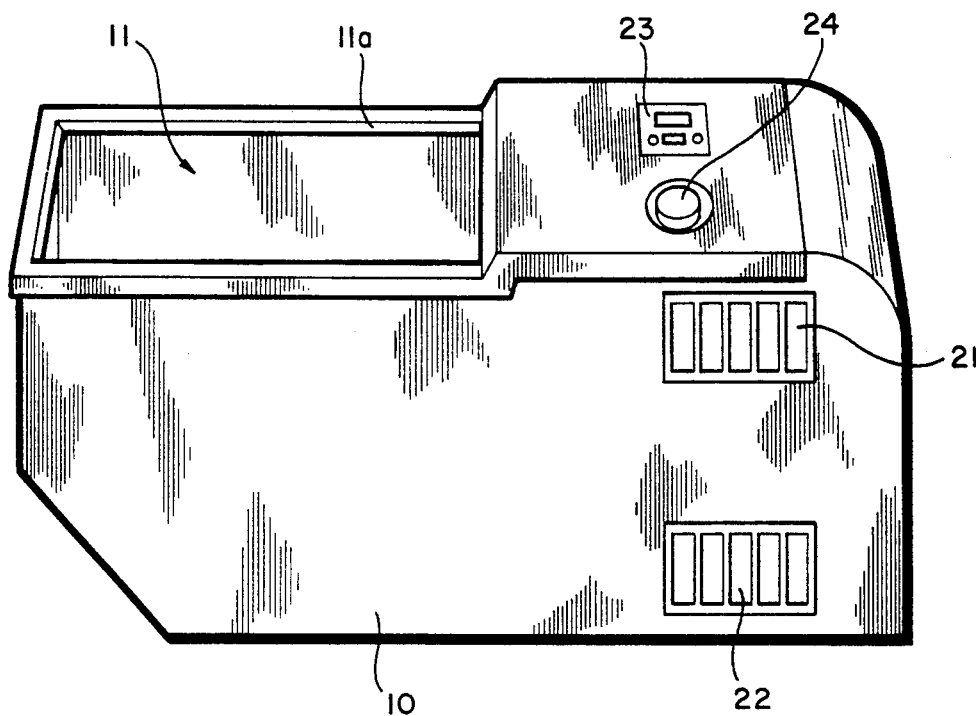
FIG. 1 is a perspective view of the part of the cooling device provided for permanent installation in the motor vehicle, i.e., the cooling device after removal of the transportable cold storage box.
Figure 4:
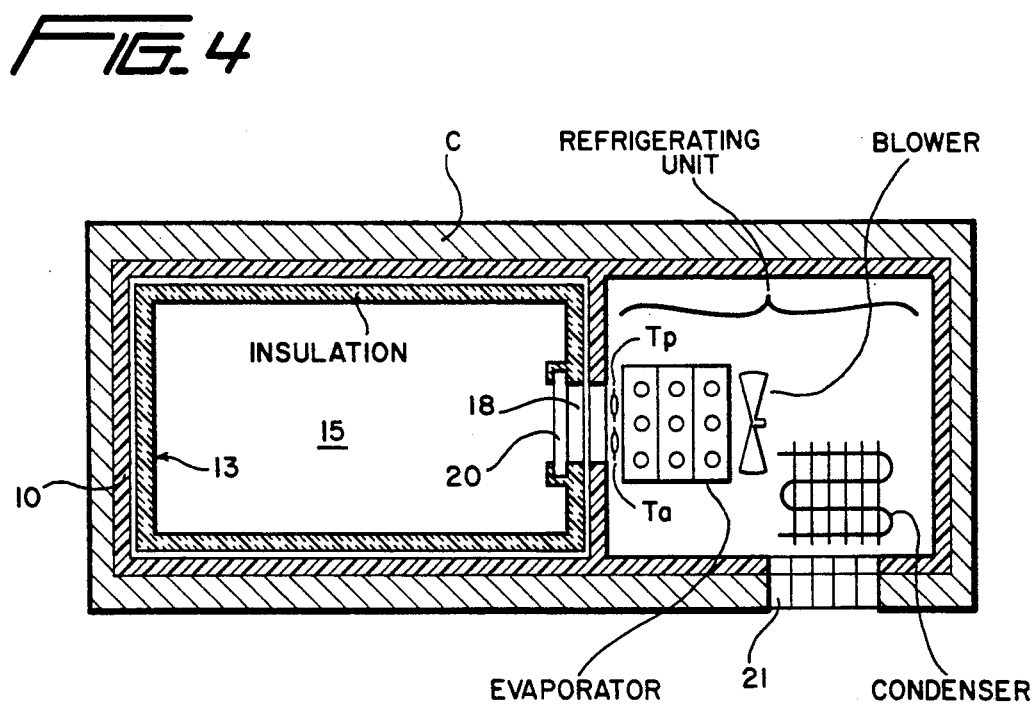
FIG. 4 is a schematic cross-sectional view of the FIG. 2 unit installed in a motor vehicle taken in a horizontal plane through the air flow outlet.

The illustrated cooling device comprises a housing 10, whose outside contour matches the body contour of the portion of the motor vehicle in which housing 10 is to be permanently installed (FIG. 4). Housing 10 forms a receiving chamber 11 for receiving a transportable cold storage box 12 (FIGS. 1 and 2), which can be inserted in receiving chamber 11 as desired and removed from receiving chamber 11 at any time as desired. Cold storage box 12 is designed as a thermally insulated container having a cold storage box body 13 and a cover 14 hinged on it. Cold storage box 12 encloses a cooling space 15 for receiving cooled or to-be-cooled product(s), for example, beverage bottles or cans.

Figure 2:
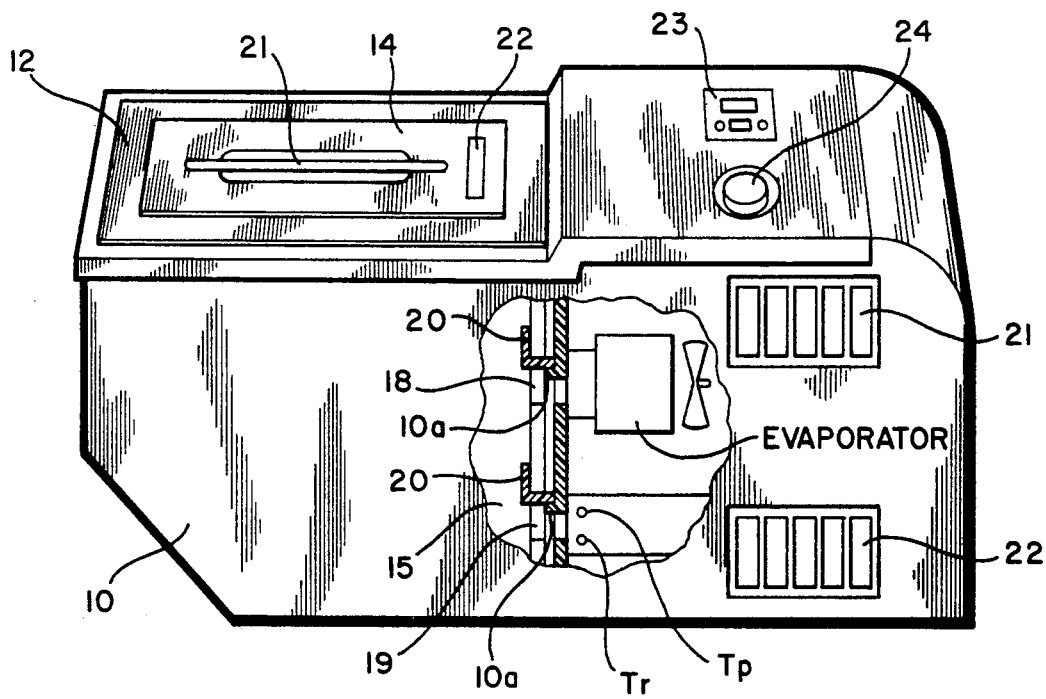
FIG. 2 is a perspective view of the cooling device with the cold storage box inserted that is partially broken away in to reveal the area of air flow inlet and air flow outlet.
Figure 3:
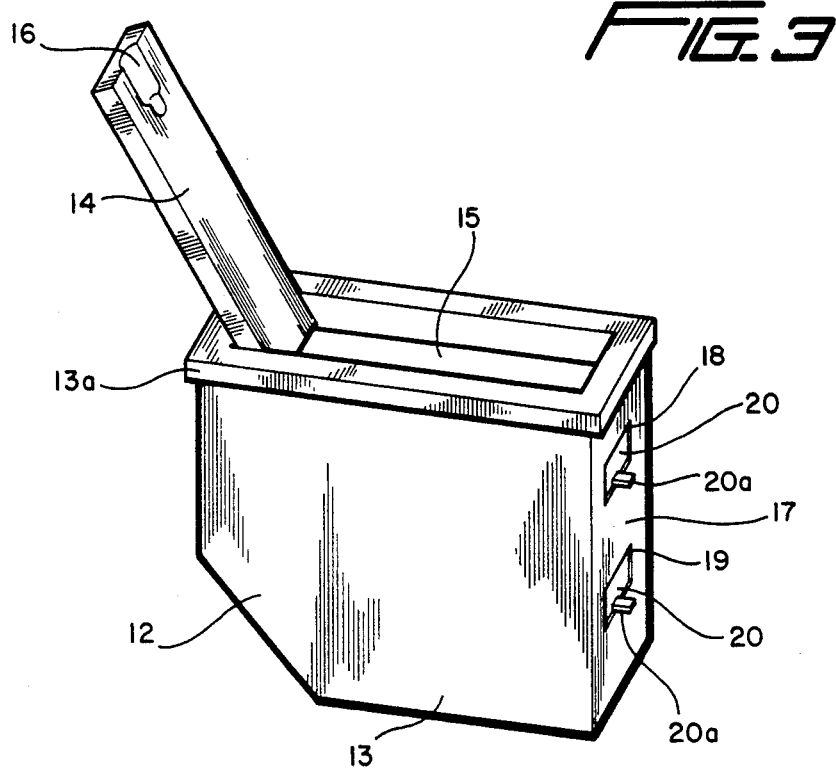
FIG. 3 is, on a larger scale, a perspective view of only of the removed cold storage box with hinged cover.

Cover 14 is equipped with a fastener 16, in the form of a magnetic fastener, a bolt or the like, to keep cover 14 normally in a closed position (FIG. 2). A cold air intake 18 and an air outlet 19 are provided on the right or front wall 17 of cold storage box body 13 as shown in FIG. 3. As long as cold storage box 12 is removed from receiving chamber 11, cold air intake 18 and air outlet 19 are each closed by a slide valve 20. If cold storage box 12 is inserted in receiving chamber 11, slide valves 20 are automatically pressed upward to open cold air intake 18 and air outlet 19. For this purpose, actuating pins 10a (FIG. 2) can be provided on a facing wall of the receiving chamber 11, each of which engage a tab 20a (FIGS. 2 & 3) or the like on a respective one of the slide valves. The tab 20a and pine 10a for the slide valve 20 of the outlet 19 are offset relative to that for the upper inlet 18 so that the outlet slide is not engaged by the pin for the inlet. When cold storage box 12 is removed from receiving chamber 11, slide valves 20, again, fall down, and optionally, this action can be aided by prestressed springs.

By pressing slide valves 20 upward when the cold storage box is inserted into receiving chamber 11, its cooling space 15 is automatically connected to a circulating circuit, in which a refrigeration unit (the evaporator, condenser and blower fan of which are only schematically depicted), located within housing 10, feeds cold air. This cold air reaches cooling space 15 through intake 18. After flowing through cooling space 15, the air leaves cold storage box 12 by outlet 19 to be cooled again by the refrigeration unit in housing 16.

The refrigeration unit can be any refrigerating machine which, preferably, is supplied energy from the power supply of the motor vehicle. For example, the refrigerating machine can be of any know type such as a compression refrigerating machine, an adsorber refrigerating machine or a Peltier refrigerating machine (cf., e.g., German Offenlegungsschrift 36 39 089). In accordance with a preferred embodiment of the invention, the refrigeration unit includes a forced ventilated condenser or liquefier, an evaporator with associated blower and an appropriate open-loop and closed-loop control device. Intake 18 and outlet 19, in this case, produce a operative connection with the evaporator of the refrigeration unit. Ventilation grates 21 and 22 are located in a side wall of housing 10 and can communicate with the outside via passages through the vehicle body, such as a console C (FIG. 4) in which the housing 10 might be mounted.

Cold storage box 12 closely fits in receiving chamber 11 with minimum clearance to facillitate removal and insertion so as to minimize air leakage around the body 13 (a further sealing against air flow leakage is provided by the seating of lip 13a of box body 13 on the inner shoulder 11a of chamber 11).

Cold storage box 12 can be designed, for example, of a two-walled construction with a thermal insulation material located between the walls (see FIG. 4). For removal of the cold storage box 12 from receiving chamber 11, the cold storage box 12 can be grasped by a handle 21 which sits on the top of cover 14. A control for releasing the latch of the fastener 16 can be provided as indicated at 22 (FIG. 2).

The open-loop and closed-loop control device of the refrigeration unit is suitably equipped with two thermostats, of which one $T_p$ is set at a permanent desired temperature, to which cooling space 15 is cooled if it is intended to remove cold storage box 12. This permanent desired temperature can be set, for example, at $+2°$ C., a value, which, on the one hand, prevents a freezing of the cooled product but, on the other hand, provides an adequate cold input to cooling space 15 to keep the cooled product cold for a relatively long period after removal of the cold storage box from receiving chamber 11. The other thermostat $T_a$ can be set to a desired temperature that is adjustable within a provided range, for example from $+4°$ C. to $+12°$ C. These thermostats have their sensing element in the path of the air exiting outlet 19 (FIG. 4). Which of the two thermostats is made active is set by the user on an operating panel 23 on the top of housing 10. Further, a signal lamp 24, in the illustrated embodiment, shows when cooling space 15 has reached the appropriate temperature for removal of the cold storage box 12.

While a particular embodiment in accordance with the present invention has shown and described, it should be understood that the invention is not limited thereto, but is susceptible of numerous changes and modifications as known to those skilled in the art. For example, outlet 19 can be at the opposite side of box body 13 from inlet 18, box body 13 and unit 10 can be differently configured and cover 14 need not be hinged in the illustrated manner. Therefore, I do not wish to be limited to the details shown and described herein, but intend to cover all such changes and modifications as are encompassed by the scope of the appended claims.

I claim:

1. Cooling device for motor vehicles comprising a refrigeration unit permanently installed in a motor vehicle, a receiving chamber permanently installed in a motor vehicle, and a cooling space for receiving a product to be cooled; where the refrigeration unit is in operative connection with the receiving chamber; wherein the cooling space is provided in a transportable cold storage box, which is removable from the receiving chamber for use in maintaining the contents of cooling space in a cooled condition outside of the motor vehicle; and wherein the cold storage box is insertable into the receiving chamber and detachably connectable with the refrigeration unit for cooling of the interior space when the storage box is in the receiving chamber.

2. Cooling device according to claim 1, wherein cold storage box is a heat-insulated container.

3. Cooling device according to claim 2, wherein the cold storage box is provided with a hinged cover.

4. Cooling device according to claim 2, wherein the refrigeration unit is located in a housing in which the receiving chamber for the transportable cold storage box is also located.

5. Cooling device according to claim 4, wherein a control device for the refrigeration unit is also provided in said housing.

6. Cooling device according to claim 4, wherein a cold air circulating device is associated with the refrigeration unit to form an air flow circuit which, when the cold storage box is in the receiving chamber, circulates cold air into the cold storage box and then discharges the air from the cold storage box.

7. Cooling device according to claim 6, wherein cold storage box is provided with a cold air intake and an air outlet and means by which, during insertion of the cold storage box into the receiving chamber, the air intake and air outlet are automatically opened to the air flow circuit and, during removal of the cold storage box from the receiving chamber, are automatically closed.

8. Cooling device according to claim 5, wherein the control device of the refrigeration unit is equipped with two thermostats, one of the thermostats being permanently set at a temperature to which the cooling space is to be cooled in case of intended removal of the cold storage box, while the other thermostat is settable to a desired temperature within an adjustable temperature range.

9. Cooling device according to claim 8, wherein the permanently set thermostat is connected to a signal lamp which is operable for indicating when the cooling space has reached the proper temperature for removal of the cold storage box.

10. Cooling device according to claim 1, wherein the cold storage box is provided with a hinged cover.

11. Cooling device according to claim 1, wherein the refrigeration unit is located in a housing in which the receiving chamber for the transportable cold storage box is also located.

12. Cooling device according to claim 11, wherein a control device for the refrigeration unit is also provided in said housing.

13. Cooling device according to claim 12, wherein a cold air circulating device is associated with the refrigeration unit to form an air flow circuit which, when the cold storage box is in the receiving chamber, circulates cold air into the cold storage box and then discharges the air from the cold storage box.

14. Cooling device according to claim 13, wherein cold storage box is provided with a cold air intake and an air outlet and means by which, during insertion of the cold storage box into the receiving chamber, the air intake and air outlet are automatically opened to the air flow circuit and, during removal of the cold storage box from the receiving chamber, are automatically closed.

15. Cooling device according to claim 12, wherein the control device of the refrigeration unit is equipped with two thermostats, one of the thermostats being permanently set at a temperature to which the cooling space is to be cooled in case of intended removal of the cold storage box, while the other thermostat is settable to a desired temperature within an adjustable temperature range.

16. Cooling device according to claim 15, wherein the permanently set thermostat is connected to a signal lamp which is operable for indicating when the cooling space has reached the proper temperature for removal of the cold storage box.

17. Cooling device according to claim 1, wherein a cold air circulating device is associated with the refrigeration unit to form an air flow circuit which, when the cold storage box is in the receiving chamber, circulates cold air into the cold storage box and then discharges the air from the cold storage box.

18. Cooling device according to claim 17, wherein cold storage box is provided with a cold air intake and an air outlet and means by which, during insertion of the cold storage box into the receiving chamber the air intake and air outlet are automatically opened to the air flow circuit and, during removal of the cold storage box from the receiving chamber, are automatically closed.

19. Cooling device according to claim 18, wherein the control device of the refrigeration unit is equipped with two thermostats, one of the thermostats being permanently set at a temperature to which the cooling space is to be cooled in case of intended removal of the cold storage box, while the other thermostat is settable to a desired temperature within an adjustable temperature range.

20. Cooling device according to claim 19, wherein the permanently set thermostat is connected to a signal lamp which is operable for indicating when the cooling space has reached the proper temperature for removal of the cold storage box.

* * * * *